United States Patent
Kawano et al.

(10) Patent No.: US 8,659,806 B2
(45) Date of Patent: Feb. 25, 2014

(54) LIGHTING DEVICE AND DOCUMENT SCANNING DEVICE HAVING THE SAME

(75) Inventors: Yuuzou Kawano, Fukuoka (JP); Yoshinori Ejima, Fukuoka (JP); Kouhei Suyama, Fukuoka (JP); Takafumi Sanada, Fukuoka (JP)

(73) Assignee: Panasonic Corporation, Osaka (JP)

( * ) Notice: Subject to any disclaimer, the term of this patent is extended or adjusted under 35 U.S.C. 154(b) by 614 days.

(21) Appl. No.: 12/897,286

(22) Filed: Oct. 4, 2010

(65) Prior Publication Data

US 2011/0080622 A1  Apr. 7, 2011

(30) Foreign Application Priority Data

Oct. 6, 2009 (JP) .................................. 2009-232658

(51) Int. Cl.
*H04N 1/04* (2006.01)

(52) U.S. Cl.
USPC ............ 358/475; 358/471; 358/473; 358/474

(58) Field of Classification Search
None
See application file for complete search history.

(56) References Cited

U.S. PATENT DOCUMENTS

| | | | | |
|---|---|---|---|---|
| 7,495,682 | B2* | 2/2009 | Kohchi et al. | 347/115 |
| 7,736,016 | B2* | 6/2010 | Suehiro et al. | 362/218 |
| 7,757,752 | B2* | 7/2010 | Egawa et al. | 165/170 |
| 8,085,449 | B2* | 12/2011 | Yoshimura | 358/475 |
| 2009/0122541 | A1* | 5/2009 | Suehiro et al. | 362/235 |
| 2009/0308584 | A1* | 12/2009 | Yang | 165/185 |
| 2009/0316064 | A1* | 12/2009 | Kono et al. | 349/58 |
| 2010/0232834 | A1* | 9/2010 | Ishida | 399/144 |

FOREIGN PATENT DOCUMENTS

JP   2006-269140   10/2006

* cited by examiner

*Primary Examiner* — Cheukfan Lee
(74) *Attorney, Agent, or Firm* — Greenblum & Bernstein, P.L.C.

(57) ABSTRACT

A lighting device includes a light source, a housing, a heat radiator, and a connector. A part of heat generated by the light source is transmitted to the housing, and the housing radiates the part of the heat. Another part of the heat generated by the light source is transmitted to the heat radiator, and the heat radiator radiates the another part of the heat. The connector transmits heat from the housing to the heat radiator when a temperature of a portion of the housing around the connector is higher than a temperature of a portion of the heat radiator around the connector. The connector transmits heat from the heat radiator to the housing when the temperature of the portion of the heat radiator around the connector is higher than the temperature of the portion of the housing around the connector.

18 Claims, 8 Drawing Sheets

LIGHTING DEVICE AND DOCUMENT SCANNING DEVICE HAVING THE SAME

CROSS-REFERENCE TO RELATED APPLICATIONS

The present application claims priority under 35 U.S.C. §119 of Japanese Application No. 2009-232658, filed on Oct. 6, 2009, the disclosure of which is expressly incorporated by reference herein in its entirety.

BACKGROUND OF THE INVENTION

1. Field of the Invention

The present invention relates to a lighting device, and to a document scanning device including the lighting device.

2. Description of Related Art

A document scanning device has a lighting device that illuminates a document face. Conventionally, such a lighting device uses a fluorescent tube such as a CCFL (cold-cathode tube) as its light source. In recent years, an LED has become common in view of saving energy.

In such an LED-type lighting device, heat generated by the LED becomes significant, as the brightness increases. So, the heat has to be radiated into the air in order to avoid overheating of the LED, breaking down of a wire, and so on. To radiate the heat, a metal housing with a high heat conductivity is used in Related Art 1. In this Related Art, the heat generated by the LED is transmitted to the housing and the housing radiates the heat into the air.

Related Art 1: Japanese Patent Application Publication No. 2006-269140

However, when the temperature of the housing itself increases, it can not radiate the heat very well. To raise radiation performance, a heat radiator that radiates a part of the heat may be provided separately from the housing. Still, when the temperature of the heat radiator increases, the heat radiator can not radiate the heat very well. Consequently, sufficient radiation performance can not be ensured.

SUMMARY OF THE INVENTION

In view of the above circumstances, the present invention provides a lighting device that ensures a required radiation performance and a document scanning device including the lighting device.

An aspect of the present invention provides a lighting device comprising a light source, a housing, a heat radiator, and a connector. A part of heat generated by the light source is transmitted to the housing, and the housing radiates the part of the heat. Another part of the heat generated by the light source is transmitted to the heat radiator, and the heat radiator radiates the another part of the heat. The connector transmits heat from the housing to the heat radiator when a temperature of a portion of the housing around the connector is higher than a temperature of a portion of the heat radiator around the connector. The connector transmits heat from the heat radiator to the housing when the temperature of the portion of the heat radiator around the connector is higher than the temperature of the portion of the housing around the connector. In this way, the housing and the heat radiator exchange heat through the connector, depending on the temperatures of their portions around the connector. Therefore, the lighting device can ensure a required radiation performance.

Another aspect of the present invention provides a document scanning device that includes the above described lighting device.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of non-limiting example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description considered taken with the drawings making apparent to those skilled in the art how the concepts and principles of the present invention may be embodied in practice.

Embodiments of the present invention will be described with reference to the drawings, hereinafter.

Figure 1:
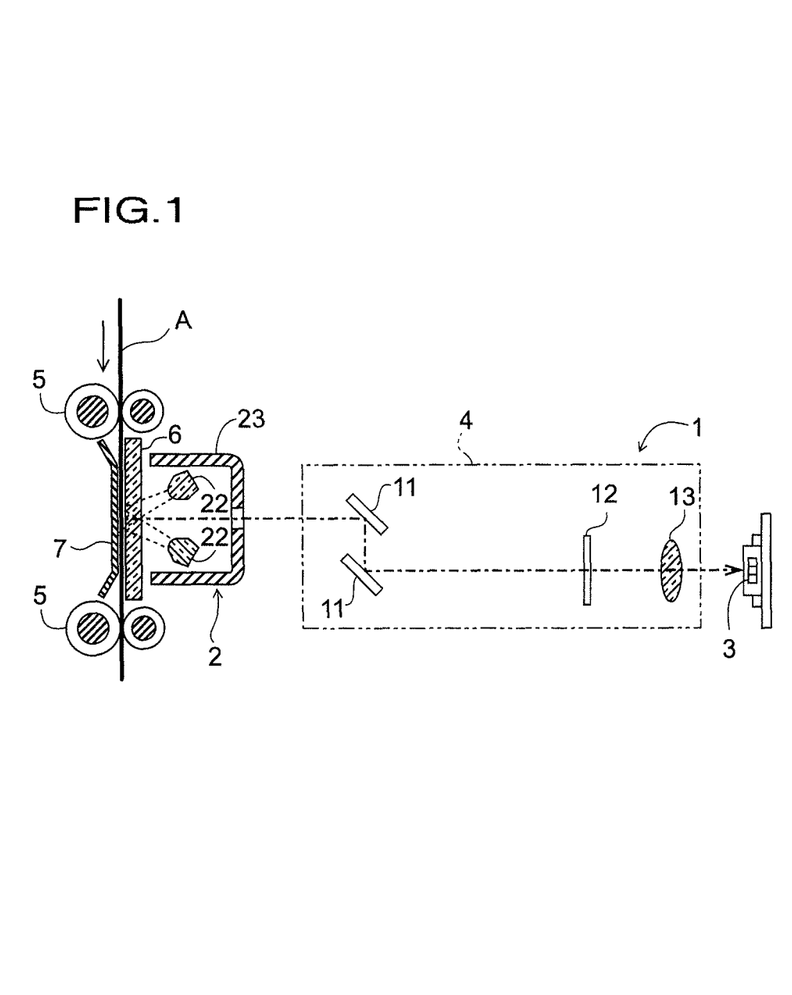
FIG. 1 is a schematic diagram illustrating a document scanning device according to embodiments of the present invention.

As shown in FIG. 1, a document scanning device 1 includes a lighting device 2, extending in a main scanning direction to illuminate a document A, a reading sensor 3 that receives light reflected from the document A and outputs an image signal, and a minification optical system 4 that guides the light reflected from the document A to the reading sensor 3.

The reading sensor 3 includes a line sensor in which multiple light-receiving elements (CCD) of each color of RGB are arranged along the main scanning direction. The light-receiving element converts light into an electric signal. The document A is fed between a document glass 6 and a document guide 7 by feed rollers 5. Thus, scanning in a sub-scanning direction is accomplished by the conveyance (or feed) of the document A.

The minification optical system 4 includes multiple mirrors 11, a slit 12 and a lens 13. The slit 12 cuts out unnecessary light. The lens 13 forms an image on a light-receiving surface of the reading sensor 3 according to the reflected light from the document A, and reduces the size of the image in the main scanning direction to match the width of the reading sensor 3.

First Embodiment

Figure 2:
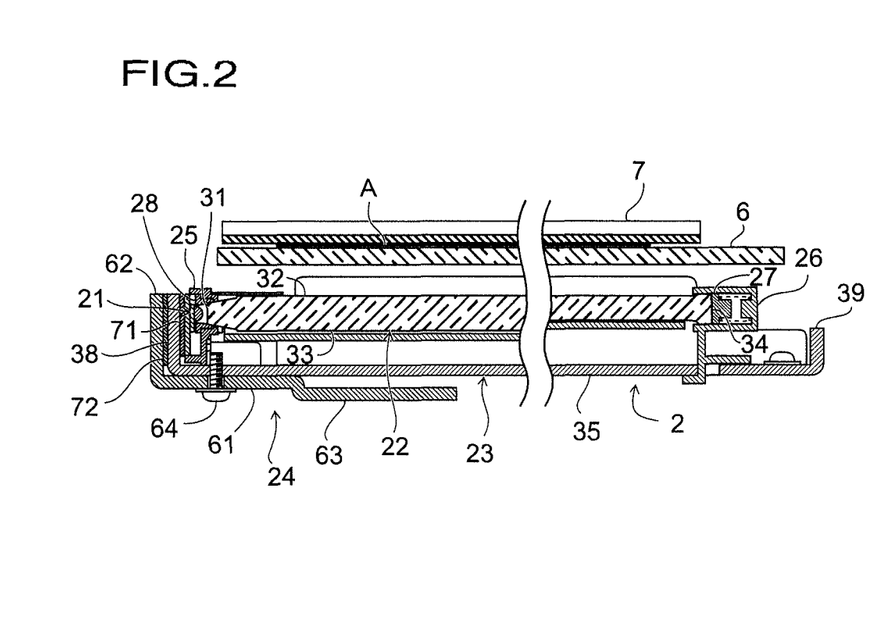
FIG. 2 is a cross-sectional view of a lighting device according to a first embodiment of the present invention.

As shown in FIG. 2, the lighting device 2 according to the first embodiment of the present invention includes a light source 21, a light guide 22 that guides the light emitted by the light source 21 to a reading surface of the document A, a housing 23 that houses the light source 21 and the light guide 22, and a heat radiator 24 that radiates heat generated by the light source 21.

The light guide 22 extends across substantially the generally entire width of the reading area. In order for the light emitted by the light source 21 to be incident to a light incident surface 31 at an end of the light guide 22 in a longitudinal direction and to be output from a light output surface 32 extending in the longitudinal direction, a light reflection portion 33 is provided to face the light output surface 32. The light guide 22 is made of a resin material, such as an acrylic resin (PMMA), etc., which has translucency. The light guide 22 has a tapered shape in which a cross-section area is gradually reduced from the light source side to the other side, opposite to the light source.

The light incident surface 31 is a flat surface, and the light output surface 32 is a curved surface having an elliptical cross-section. In the light reflection portion 33, multiple projection-like prisms, each having a triangular or trapezoidal cross-section, are arranged on the light guide 22 along the longitudinal direction. Each prism extends in a direction perpendicular to the longitudinal direction of the light guide 22.

An end portion of the light guide 22 on the light source side is held by a first holding member 25. The other end portion of the light guide 22 on the opposite side of the light source is held by a second holding member 26. A light reflector 28, which guides the light emitted by the light source 21 to the light incident surface 31 of the light guide 22, is provided at the end portion of the light guide 22 on the light source side. A mirror member 27 is accommodated in the second holding member 26, which holds the end portion of the light guide 22 on the opposite side of the light source. The mirror member 27 is able to contact an end surface 34 of the light guide 22. The mirror member 27 has a reflection surface on the side of the end surface 34 of the light guide 22. The light that reaches the end surface 34 of the light guide 22 after repeatedly being refracted and reflected in the light guide 22, is reflected by the reflection surface of the mirror member 27, and returns to the interior of the light guide 22.

In this embodiment, two light guides 22 are provided in parallel with each other (see FIG. 1). Further, two light sources 21 are provided to respectively correspond to the two light guides 22.

Figure 3:
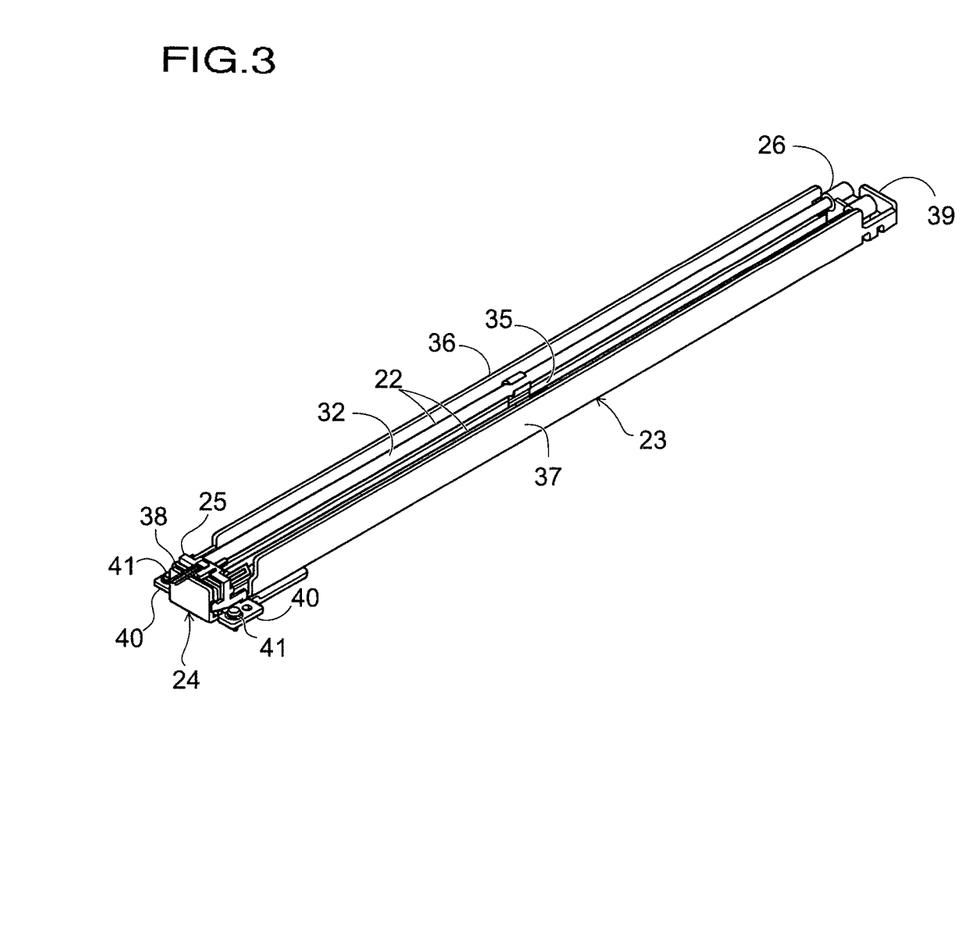
FIG. 3 is a perspective view of the lighting device shown in FIG. 2.

As shown in FIG. 3, the housing 23 houses the light guide 22. The housing 23 is an elongated box having an opening portion on the side of the light output surface 32 of the light guide 22. The housing 23 includes a bottom wall portion 35, a pair of side wall portions 36, 37, and another pair of side wall portions 38, 39. The side wall portions 36, 37 extend along the longitudinal direction of the light guide 22. The side wall portions 38, 39 are provided at one and the other ends of the light guide 22 in the longitudinal direction thereof. The housing 23 is produced from a plate made of a metal, such as an aluminum alloy, etc., through punching and bending processes.

Mounting portions 40 are provided in the vicinity of the side wall portion 38 on the light source side. The mounting portions 40 extend outwardly in a direction perpendicular to the longitudinal direction of the light guide 22. The mounting portions 40 have holes into which main body mounting screws 41 are inserted. The housing 23 is fixed to a main body (not shown) of the document scanning device with the main body mounting screws 41.

Figure 4:
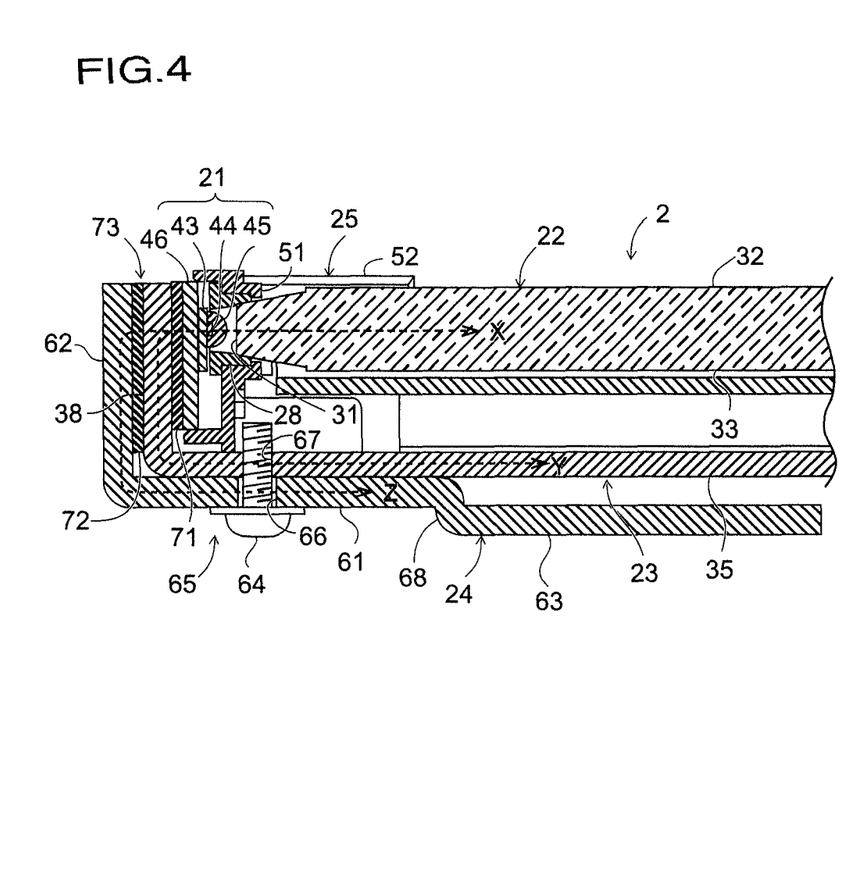
FIG. 4 is a cross-sectional view illustrating a main portion of the lighting device shown in FIG. 2.

As shown in FIG. 4, the light source 21 has an LED chip 44 provided on a ceramic base 43, and a semispherical lens 45 that covers the LED chip 44. The light source 21 is a one-chip type white LED. Thus, the LED chip 44 emits blue light and the lens 45 is made of a transparent bonding material, such as a silicon, etc., in which yellow phosphor is distributed. The blue light emitted by the LED chip 44 is converted into yellow light by the yellow phosphor in the lens 45, and white light is produced by mixing the blue light transmitted through the lens 45 with the yellow light emitted by the yellow phosphor.

The light source 21 is supported by a light source support plate 46, such that a rear surface of the base 43 is bonded to the light source support plate 46. The light source support plate 46 is made of a metal material, such as an aluminum alloy etc., having an excellent heat conductivity. The light source support plate 46 is held by a main body portion 51 of the first holding member 25. Thus, the light source 21 is positioned to overlap an inner surface of the side wall portion 38 of the housing 23.

Figure 5:
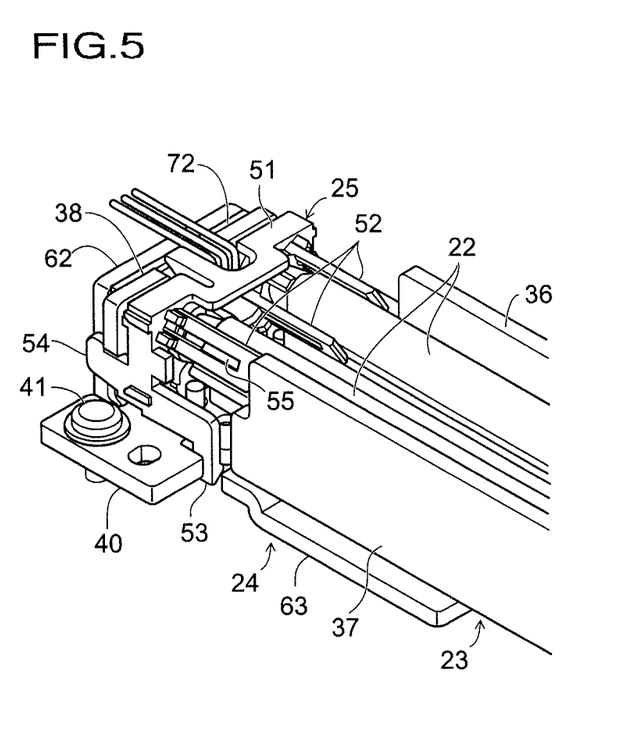
FIG. 5 is a perspective view illustrating the main portion of the lighting device shown in FIG. 2.
Figure 6:
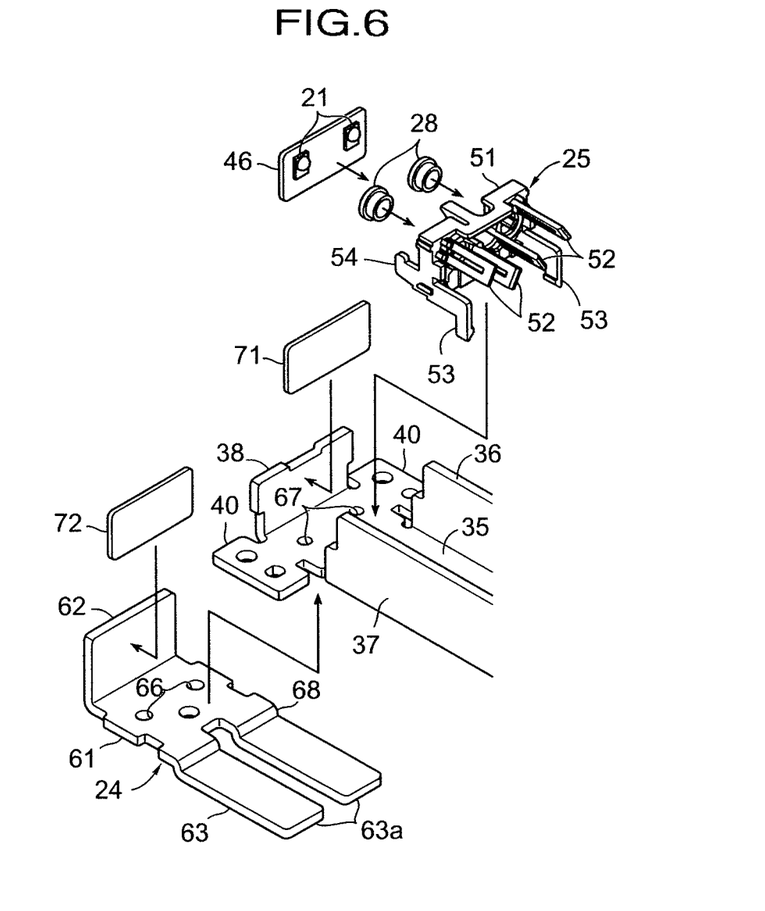
FIG. 6 is an exploded perspective view illustrating the main portion of the lighting device shown in FIG. 2.

The first holding member 25 holds the light source 21 and the light guide 22. As shown in FIGS. 5 and 6, holding pieces 52, which sandwich the light guide 22 therebetween, extend from the main body portion 51. The holding pieces 52 are engaged with a rib 55 provided on the light guide 22. Thus, the light guide 22 is prevented from being separated from the holding pieces 52, and from being rotated about an axis line.

The first holding member 25 is provided with mounting pieces 53, 54 to fix the first holding member 25 to the housing 23. The mounting pieces 53, 54 are provided to each side of the main body portion 51, and engage with the housing 23 such that the mounting pieces 53, 54 sandwich the bottom wall portion 35 and the side wall portion 38 from both sides. The first holding member 25 is made of a resin material, such as ABS etc., having excellent thermal properties (thermal resistance and low-thermal expansion rate).

As shown in FIG. 4, the heat radiator 24 has a generally L-shaped cross-section so as to be curved (or bent) along the side wall portion 38 and the bottom wall portion 35 of the housing 23. The heat radiator 24 includes a base portion 61, which is connected to the bottom wall portion 35 of the housing 23, a heat input portion 62, and the heat radiation portion 63. The heat input portion 62 is formed by bending the base portion 61 into an L-shape, and extends along the side wall portion 38 of the housing 23. The heat radiation portion 63 extends from the base portion 61 toward the opposite side of the heat input portion 62, and along the bottom wall portion 35 of the housing 23. The heat radiator 24 is produced from a plate made of a metal, such as an aluminum alloy, etc., through punching and bending processes.

A material having a thermal resistance similar to that of the housing 23 may be used for the heat radiator 24 to provide sufficient heat radiation. However, if a material having a heat resistance smaller than that of the housing 23 is used for the radiator 24, an amount of heat transferred to the heat radiator 24 becomes larger than that transferred to the housing 23, and thus, the heat radiation from the heat radiator 24 is further facilitated.

The base portion 61 of the heat radiator 24 is connected to the bottom wall portion 35 of the housing 23 with a connector 65 comprising fastening screws 64. The heat radiator 24 is fixed to the housing 23 by this connector 65. The fastening screws 64 pass through insertion openings 66 provided in the base portion 61 of the heat radiator 24, and are engaged with screw holes 67 provided in the bottom wall portion 35 of the housing 23. The fastening screws 64 are made of a metal material having an excellent heat conductivity, and the heat radiator 24 and the housing 23 are thermally linked through the fastening screws 64.

The heat radiation portion 63 of the heat radiator 24 is connected to the base portion 61, which contacts the bottom wall portion 35 of the housing 23, via a step portion 68. The step portion 68 separates the heat radiation portion 63 from the bottom wall portion 35 of the housing 23, to provide a gap between the heat radiation portion 63 and the bottom wall portion 35 of the housing 23. Further, the heat radiation portion 63 is provided with a slit or cutout extending in the longitudinal direction of the housing 23, to form a pair of heat radiation pieces 63a (see FIG. 6). Accordingly, the heat radiation from the heat radiation portion 63 is facilitated.

The heat input portion 62 of the heat radiator 24 overlaps the light source 21 via the side wall portion 38 of the housing 23. A heat transfer sheet 71 is interposed between the light source support plate 46, to which the light source 21 is bonded, and the side wall portion 38 of the housing 23. Further, a heat transfer sheet 72 is interposed between the side wall portion 38 of the housing 23 and the heat input portion 62 of the heat radiator 24. The stacked layers of these members constitute a sandwich portion 73. In this embodiment, the light source 21, the side wall portion 38 of the housing 23, and the heat input portion 62 of the heat radiator 24 are thermally linked via the heat transfer sheets 71 and 72.

The heat transfer sheets 71, 72 may be made of a flexible resin elastomer material. For example, a low hardness high heat conductivity silicone rubber laminated on both sides with separator films may be preferably used. By doing this, the heat transfer sheet 71 tightly adheres to the light source support plate 46 and the side wall portion 38 of the housing 23. Further, the heat transfer sheet 72 tightly adheres to the side wall portion 38 of the housing 23 and the heat input portion 62 of the heat radiator 24. Therefore, the heat transfer at the sandwich portion 73 is facilitated, and the radiation performance can be further improved.

In the lighting device 2 thus configured, as shown in FIG. 4, three heat transmitting paths indicated by arrows X, Y, Z are provided. In the heat transmitting path indicated by the arrow X, a part of heat generated by the light source 21 is transferred to the light guide 22 via an air layer in the light reflector 28, and is then radiated to the air from the light guide 22. In the heat transmitting path indicated by the arrow Y, a part of heat generated by the light source 21 is transferred from the light source support plate 46 to the side wall portion 38 of the housing 23 via the heat transfer sheet 71, and is then radiated to the air from the housing 23. Further, in the heat transmitting path indicated by the arrow Z, a part of heat generated by the light source 21 is transferred from the light source support plate 46 to the heat input portion 62 of the heat radiator 24 via the heat transfer sheet 71, the side wall portion 38 of the housing 23, and the heat transfer sheet 72 in series, and is then radiated to the air from the heat radiation portion 63 of the heat radiator 24.

Further, the connector 65, by the fastening screw 64, between the housing 23 and the heat radiator 24 has a function to exchange heat between the housing 23 and the heat radiator 24 in accordance with the difference in temperature between the bottom wall portion 35 of the housing 23 and the base portion 61 of the heat radiator 24. In other words, when the temperature of a portion of the bottom wall portion 35 of the housing 23 around the fastening screw 64 is higher than the temperature of a portion of the base portion 61 of the heat radiator 24 around the fastening screw 64, heat is transferred from the bottom wall portion 35 of the housing 23 to the base portion 61 of the heat radiator 24, and is then radiated from the heat radiation portion 63 of the heat radiator 24 to the air. On the other hand, when the temperature of the portion of the bottom wall portion 35 of the housing 23 around the fastening screw 64 is lower than the temperature of the portion of the base portion 61 of the heat radiator 24 around the fastening screw 64, heat is transferred from the base portion 61 of the heat radiator 24 to the bottom wall portion 35 of the housing 23, and is then radiated from the housing 23 to the air.

As described above, the heat radiator 24 is fixed to the housing 23 at a position spaced from the light source 21, and heat is exchanged between the heat radiator 24 and the housing 23 at the connector 65 in accordance with the difference in temperature between the heat radiator 24 and the housing 23. Therefore, even if the radiation performance of the housing 23 itself is reduced due to the increase in temperature of the housing 23, excessive heat is transferred from the housing 23 to the heat radiator 24. Further, when the temperature of the heat radiator 24 increases, excessive heat thereof is transferred to the housing 23. Thus, high radiation performance can be ensured.

Further, since the housing 23 overlaps the light source 21 via the flexible heat transfer sheet 71, it is possible to reduce an influence of the thermal deformation of the housing 23 and the heat radiator 24 on the position and orientation of the light source 21. Moreover, the light source 21 is fixed to the housing 23 via the holding member 25, and the holding member 25 is made of a resin material with small thermal deformation to reduce an occurrence of thermal deformation thereof. Therefore, it is possible to reduce the change in position and posture of the light source 21 caused by the thermal deformation of the holding member 25. Thus, deviation of the optical axis of the light source 21 can be reduced. Additionally, since the holding member 25 holds the light source 21 and the light guide 22 in an integrated manner, the positional relationship between the light source 21 and the light guide 22 is prevented from being changed.

Second Embodiment

Figure 7:
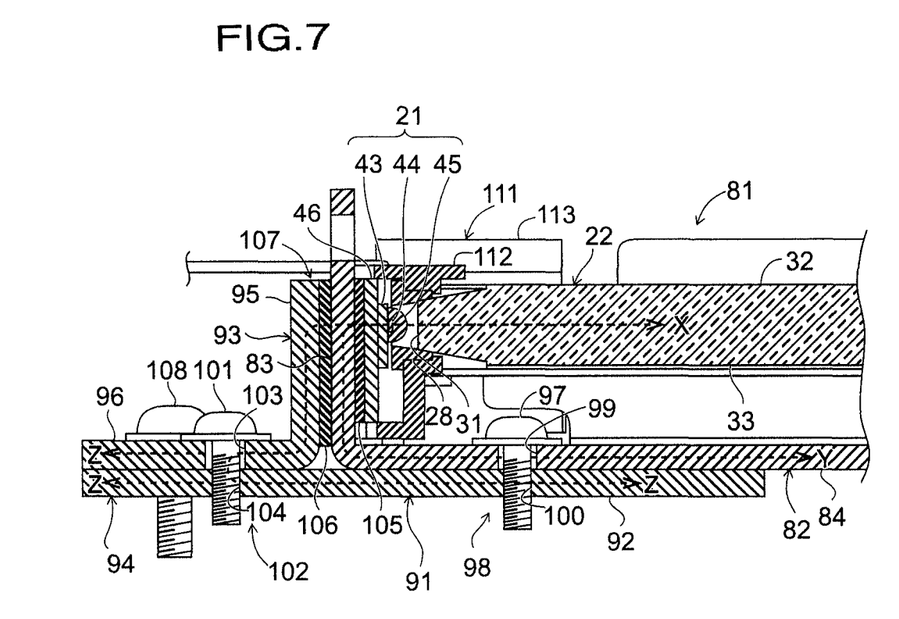
FIG. 7 is a cross-sectional view illustrating a main portion of a lighting device according to a second embodiment of the present invention.
Figure 8:
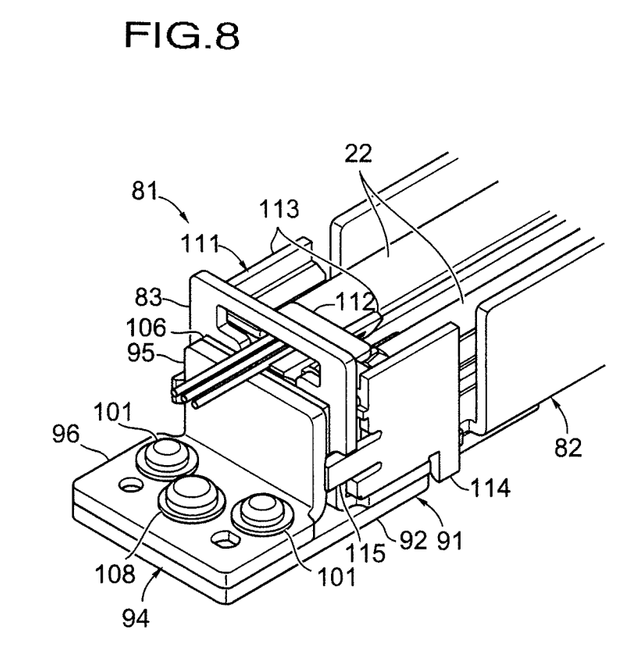
FIG. 8 is a perspective view illustrating the main portion of the lighting device shown in FIG. 7.

As shown in FIGS. 7 and 8, in a lighting device 81 according to the second embodiment of the present invention, similar to the first embodiment, the light source 21 is positioned to overlap an inner surface of the side wall portion 83 of the housing 82. On the other hand, a heat radiator 91 includes a first heat radiation member 92 and a second heat radiation member 93. The first heat radiation member 92 is provided along the bottom wall portion 84 of the housing 82. The second heat radiation member 93 is provided along the side wall portion 83 of the housing 82. Further, an extending portion 94 is provided in which mutually overlapped first and second heat radiation portions 92, 93 together extend outwardly in a direction perpendicular to the side wall portion 83 of the housing 82.

The second heat radiation member 93 has a generally L-shaped cross-section, in which a heat radiation portion 96 extends from a heat input portion 95, which overlaps an outer surface of the side wall portion 83 of the housing 82, in a direction perpendicular to the heat input portion 95. The first heat radiation member 92 has a generally planar shape that extends along an outer surface of the bottom wall portion 84 of the housing 82, and a surface of the heat radiation portion 96 of the second heat radiation member 93, which is positioned to be flush with the outer surface of the bottom wall portion 84. The first heat radiation member 92 and the second heat radiation member 93 are made of a metal such as aluminum alloy, etc.

The first heat radiation member 92 is connected to the bottom wall portion 84 of the housing 82 with a connector 98 including fastening screws 97. The first heat radiation member 92 is fixed to the housing 82 by this connector 98. The fastening screws 97 pass through insertion openings 99 provided in the bottom wall portion 84 of the housing 82, and are threaded into screw holes 100 provided in the first heat radiation member 92. The fastening screws 97 are made of a metal material having an excellent heat conductivity, and the first heat radiation member 92 and the bottom wall portion 84 of the housing 84 are thermally linked through the fastening screws 97.

The second heat radiation member 93 is connected to the first heat radiation member 92 by a connector 102 comprising fastening screws 101. The second heat radiation member 93 is fixed to the housing 82 via the first heat radiation portion 92 by this connector 102. The fastening screws 101 pass through insertion openings 103 provided in the second heat radiation member 93 and are threaded into screw holes 104 provided in the first heat radiation member 92. The fastening screws 101 are made of a metal material having an excellent heat conductivity, and the first heat radiation member 92 and the second heat radiation member 93 are thermally linked via the fastening screws 101.

The heat input portion 95 of the second heat radiation member 93 overlaps the light source 21 via the side wall portion 83 of the housing 82. A heat transfer sheet 105 is interposed between the light source support plate 46, to which the light source 21 is bonded, and the side wall portion 83 of the housing 82. Further, a heat transfer sheet 106 is interposed between the side wall portion 83 of the housing 82 and the heat input portion 95 of the second heat radiation member 93. The stacked layers of these members constitute a sandwich portion 107, similar to the first embodiment. In this embodiment, the light source 21, the side wall portion 83 of the housing 82, and the heat input portion 95 of the second heat radiation portion 93 are thermally linked via the heat transfer sheets 105 and 106.

Further, the extending portion 94 of the heat radiator 91 also functions as a mounting portion to fix the housing 82 to the main body of the document scanning device. The extending portion 94 has an opening into which a main body mounting screw 108 is inserted. By doing this, the dimension of the housing in the width direction thereof can be reduced, compared with the configuration according to the first embodiment in which the mounting portion 40 extends outwardly in a width direction of the side wall portion 38.

In the lighting device 81 thus configured, as shown in FIG. 7, three heat transmitting paths indicated by arrows X, Y, Z are provided. In the heat transmitting path indicated by the arrow X, a part of heat generated by the light source 21 is transferred to the light guide 22 through an air layer in the light reflector 28, and is then radiated to the air from the light guide 22. In the heat transmitting path indicated by the arrow Y, a part of heat generated by the light source 21 is transferred from the light source support plate 46 to the side wall portion 83 of the housing 82 via the heat transfer sheet 105, and is then radiated to the air from the housing 82. Further, in the heat transmitting path indicated by the arrow Z, a part of heat generated by the light source 21 is transferred from the light source support plate 46 to the heat input portion 95 of the second heat radiation member 93 via the heat transfer sheet 105, the side wall portion 83 of the housing 82, and the heat transfer sheet 106 in series, and is then radiated to the air from the heat radiation portion 96 of the second heat radiation member 93.

Further, the connector 102, by the fastening screws 101, between the first heat radiation member 92 and the second heat radiation member 93 has a function to exchange heat between the first heat radiation member 92 and the second heat radiation member 93. Heat is transferred from the second heat radiation member 93 to the first radiation member 92 via the fastening screws 101, and is radiated to the air from a portion of the first heat radiation member 92, which forms the extending portion 94, and is also radiated to the air from another portion of the first heat radiation member 92, which extends along the bottom wall portion 84 of the housing 82.

Furthermore, the connector 98, by the fastening screws 97, between the first heat radiation member 92 and the bottom wall portion 84 of the housing 82 functions to exchange heat between the first radiation member 92 and the bottom wall portion 84 of the housing 82 in accordance with the difference in temperature between the first heat radiation 92 and the bottom wall portion 84 of the housing 82. In other words, when the temperature of a portion of the bottom wall portion 84 of the housing 82 around the fastening screw 97 is higher than the temperature of a portion of the first heat radiation member 92 around the fastening screw 97, heat is transferred from the bottom wall portion 84 of the housing 82 to the first heat radiation member 92, and is then radiated from the first heat radiation member 92 to the air. On the other hand, when the temperature of the portion of the bottom wall portion 84 of the housing 82 around the fastening screw 97 is lower than the temperature of the portion of the first heat radiation member 92 around the fastening screw 97, heat is transferred from the first heat radiation member 92 to the bottom wall portion 84 of the housing 82, and is then radiated from the housing 82 to the air.

In this embodiment as well, similar to the first embodiment, a main body portion 112 of a holding member 111 holds the light source support plate 46, to which the light source 21 is bonded. Further, holding pieces 113, which sandwich the light guide 22 therebetween, extend from the main body portion 112. Moreover, the holding portion 111 is provided with mounting pieces 114, 115 for fixing the holding portion 111 to the housing 82.

A lighting device and a document scanning device including the same according to the features of the present invention are useful as a lighting device and a document scanning device having the same, in which, when the heat generated by a light source is released, a required radiation performance is ensured, even if the radiation performance of the housing itself is reduced by the increase in temperature of the housing, and the lighting device includes a light source, an optical component that guides light emitted by the light source to a predetermined direction and a housing that houses the light source and the optical component.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A lighting device comprising:
   a light source;
   a housing, a part of heat generated by the light source being transmitted to the housing, the housing radiating the part of the heat;
   a heat radiator, another part of the heat generated by the light source being transmitted to the heat radiator, at least a portion of the heat radiator being positioned externally of the housing, the heat radiator radiating the another part of the heat; and
   a connector that transmits heat from the housing to the heat radiator when a temperature of a portion of the housing around the connector is higher than a temperature of a portion of the heat radiator around the connector and transmits heat from the heat radiator to the housing when the temperature of the portion of the heat radiator around the connector is higher than the temperature of the portion of the housing around the connector.

2. The lighting device according to claim 1, wherein the part of the heat is transmitted to the housing in a vicinity of the light source.

3. The lighting device according to claim 2, wherein a flexible heat transfer sheet is interposed between the light source and the housing and the part of the heat is transmitted to the housing through the heat transfer sheet.

4. The lighting device according to claim 3, wherein the flexible heat transfer sheet is comprises a resin.

5. The lighting device according to claim 1, wherein the another part of the heat is transmitted to the heat radiator in a vicinity of the light source.

6. The lighting device according to claim 5, wherein the another part of the heat is transmitted to the heat radiator via the housing.

7. The lighting device according to claim 6, wherein a flexible heat transfer sheet is interposed between the housing and the heat radiator and the another part of the heat is transmitted to the heat radiator through the heat transfer sheet.

8. The lighting device according to claim 7, wherein the flexible heat transfer sheet is comprises a resin.

9. The lighting device according to claim 1, wherein a thermal resistance of the heat radiator is smaller than a thermal resistance of the housing.

10. The lighting device according to claim 1, wherein the connector fixes the heat radiator to the housing.

11. The lighting device according to claim 10, wherein the connector is a screw.

12. The lighting device according to claim 1, wherein the connector is at a position spaced from the light source.

13. A document scanning device comprising the lighting device according to claim 1.

14. The lighting device according to claim 1, at least a part of said radiator is external to said housing.

15. A lighting device comprising:
    a light source;
    a housing, a part of heat generated by the light source being transmitted to the housing, the housing radiating the part of the heat;
    a heat radiator, another part of the heat generated by the light source being transmitted to the heat radiator, the heat radiator radiating the another part of the heat;
    a connector that transmits heat from the housing to the heat radiator when a temperature of a portion of the housing around the connector is higher than a temperature of a portion of the heat radiator around the connector and transmits heat from the heat radiator to the housing when the temperature of the portion of the heat radiator around the connector is higher than the temperature of the portion of the housing around the connector; and
    a flexible heat transfer sheet interposed between the light source and the housing and the part of the heat is transmitted to the housing through the heat transfer sheet.

16. The lighting device according to claim 15, wherein the flexible heat transfer sheet comprises a resin.

17. A lighting device comprising:
    a light source;
    a housing, a part of heat generated by the light source being transmitted to the housing, the housing radiating the part of the heat;
    a heat radiator, another part of the heat generated by the light source being transmitted to the heat radiator, the heat radiator radiating the another part of the heat;
    a connector that transmits heat from the housing to the heat radiator when a temperature of a portion of the housing around the connector is higher than a temperature of a portion of the heat radiator around the connector and transmits heat from the heat radiator to the housing when the temperature of the portion of the heat radiator around the connector is higher than the temperature of the portion of the housing around the connector; and
    a flexible heat transfer sheet interposed between the housing and the heat radiator and the another part of the heat is transmitted to the heat radiator through the heat transfer sheet.

18. The lighting device according to claim 17, wherein the flexible heat transfer sheet comprises a resin.

* * * * *